United States Patent
Bizub (10) Patent No.: US 9,803,567 B2
(45) Date of Patent: Oct. 31, 2017

(54) SYSTEM AND METHOD FOR DETECTING RECIPROCATING DEVICE ABNORMALITIES UTILIZING STANDARD QUALITY CONTROL TECHNIQUES

(71) Applicant: General Electric Company, Schenectady, NY (US)

(72) Inventor: Jeffrey Jacob Bizub, Milwaukee, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 256 days.

(21) Appl. No.: 14/591,192

(22) Filed: Jan. 7, 2015

(65) Prior Publication Data
US 2016/0195029 A1    Jul. 7, 2016

(51) Int. Cl.
| F02D 41/22 | (2006.01) |
| F02D 35/02 | (2006.01) |
| G01L 23/22 | (2006.01) |
| G01M 15/04 | (2006.01) |
| F02D 41/28 | (2006.01) |

(52) U.S. Cl.
CPC ........... *F02D 35/027* (2013.01); *F02D 41/22* (2013.01); *G01L 23/221* (2013.01); *G01M 15/042* (2013.01); *F02D 2041/288* (2013.01); *Y02T 10/40* (2013.01)

(58) Field of Classification Search
None
See application file for complete search history.

(56) References Cited

U.S. PATENT DOCUMENTS

| 5,029,565 A | 7/1991 | Talbot |
| 5,111,790 A | 5/1992 | Grandy |
| 5,115,778 A | 5/1992 | Holroyd |
| 5,119,783 A | 6/1992 | Komurasski |
| 5,241,480 A | 8/1993 | Takaku et al. |
| 5,257,533 A | 11/1993 | Imada |
| 5,337,240 A | 8/1994 | Nakagawa et al. |
| 5,339,245 A | 8/1994 | Hirata et al. |
| 5,361,213 A | 11/1994 | Fujieda et al. |
| 5,392,642 A | 2/1995 | Tao |
| 5,400,648 A | 3/1995 | Mahr |
| 5,452,699 A | 9/1995 | Rossignol |

(Continued)

FOREIGN PATENT DOCUMENTS

| CN | 203480037 | 3/2014 |
| EP | 0731349 A1 | 9/1996 |

(Continued)

OTHER PUBLICATIONS

European Search Report and Opinion issued in connection with corresponding EP Application No. 16150238.0 dated May 23, 2016.

(Continued)

*Primary Examiner* — Paul West
*Assistant Examiner* — Mark A Shabman
(74) *Attorney, Agent, or Firm* — Fletcher Yoder, P.C.

(57) ABSTRACT

A system includes a controller configured to receive a signal acquired by the at least one knock sensor coupled to a reciprocating device, to sample the received signal, to analyze the sampled signal, and to utilize standard quality control (SQC) techniques to perform real-time diagnostics on the reciprocating device based on the analyzed signal.

10 Claims, 7 Drawing Sheets

(56) References Cited

U.S. PATENT DOCUMENTS

| | | | |
|---|---|---|---|
| 5,467,638 A | 11/1995 | Philipp | |
| 5,594,649 A | 1/1997 | Cook et al. | |
| 5,693,936 A | 12/1997 | Komachiya et al. | |
| 5,763,769 A | 6/1998 | Kluzner | |
| 5,837,887 A | 11/1998 | Shibata et al. | |
| 5,905,193 A | 5/1999 | Hashizume et al. | |
| 5,932,801 A | 8/1999 | Akishita et al. | |
| 5,934,256 A | 8/1999 | Wenzlawski et al. | |
| 5,996,398 A | 12/1999 | Schleupen et al. | |
| 6,104,195 A | 8/2000 | Yoshinaga et al. | |
| 6,273,064 B1 | 8/2001 | Scholl et al. | |
| 6,276,334 B1 | 8/2001 | Flynn et al. | |
| 6,330,877 B1 | 12/2001 | Nordin | |
| 6,336,355 B1 | 1/2002 | Sasaki et al. | |
| 6,550,311 B2 | 4/2003 | Sloboda | |
| 6,598,468 B2 | 7/2003 | Zur Loye et al. | |
| 6,662,781 B1 | 12/2003 | Torno et al. | |
| 6,814,054 B2 | 11/2004 | Sauler et al. | |
| 6,862,517 B2 | 3/2005 | Galtier | |
| 6,885,932 B2 | 4/2005 | Liu et al. | |
| 6,912,460 B2 | 6/2005 | Sauler et al. | |
| 6,947,829 B2 | 9/2005 | Honda | |
| 6,978,771 B2 | 12/2005 | Kuzuyama et al. | |
| 6,990,947 B2 | 1/2006 | Kuzuyama et al. | |
| 7,021,128 B2 | 4/2006 | Rauchfuss et al. | |
| 7,027,909 B2 | 4/2006 | deBotton et al. | |
| 7,181,338 B2 | 2/2007 | Takemura et al. | |
| 7,181,339 B2 * | 2/2007 | Remelman | G01L 23/225 123/406.27 |
| 7,191,658 B2 | 3/2007 | Oda et al. | |
| 7,212,909 B2 | 5/2007 | Yoshino et al. | |
| 7,243,529 B2 | 7/2007 | Takemura et al. | |
| 7,246,600 B2 | 7/2007 | Nakashima et al. | |
| 7,260,469 B2 | 8/2007 | Birk et al. | |
| 7,263,872 B2 | 9/2007 | Danet et al. | |
| 7,310,993 B2 | 12/2007 | Popielas et al. | |
| 7,325,529 B2 | 2/2008 | Ancimer et al. | |
| 7,356,404 B2 | 4/2008 | Takemura et al. | |
| 7,376,506 B2 | 5/2008 | Schueler | |
| 7,383,816 B2 | 6/2008 | Zurlo | |
| 7,444,231 B2 | 10/2008 | Ancimer et al. | |
| 7,444,236 B2 | 10/2008 | Wiles | |
| 7,448,254 B2 | 11/2008 | Kurtz et al. | |
| 7,546,198 B2 | 6/2009 | Remelman | |
| 7,559,230 B2 | 7/2009 | Zimmer | |
| 7,571,640 B2 | 8/2009 | Andrews | |
| 7,628,253 B2 | 12/2009 | Jin et al. | |
| 7,669,582 B2 | 3/2010 | Kaneko et al. | |
| 7,712,450 B2 | 5/2010 | Sato et al. | |
| 7,747,380 B2 | 6/2010 | Chauvin et al. | |
| 7,810,469 B2 | 10/2010 | Vigild et al. | |
| 7,823,561 B2 | 11/2010 | Omuro et al. | |
| 8,000,884 B2 | 8/2011 | Aso et al. | |
| 8,032,293 B2 | 10/2011 | Binder et al. | |
| 8,068,972 B2 | 11/2011 | Auclair et al. | |
| 8,078,389 B2 | 12/2011 | Huang et al. | |
| 8,079,261 B2 | 12/2011 | Crickmore et al. | |
| 8,108,131 B2 | 1/2012 | Huang et al. | |
| 8,155,857 B2 | 4/2012 | Loeffler et al. | |
| 8,250,905 B2 | 8/2012 | Schneider et al. | |
| 8,260,531 B2 | 9/2012 | Yasuda | |
| 8,316,824 B2 | 11/2012 | Hagari et al. | |
| 8,342,011 B2 | 1/2013 | Galtier et al. | |
| 8,359,909 B2 | 1/2013 | Duval et al. | |
| 8,396,649 B2 | 3/2013 | Huang | |
| 8,463,533 B2 | 6/2013 | Glugla et al. | |
| 8,499,623 B2 | 8/2013 | Duval et al. | |
| 8,528,521 B2 | 9/2013 | Landsmann et al. | |
| 8,538,666 B2 | 9/2013 | Buslepp et al. | |
| 8,606,484 B2 | 12/2013 | Ohata | |
| 8,627,800 B2 | 1/2014 | Glugla et al. | |
| 8,639,432 B2 | 1/2014 | Matsuo et al. | |
| 8,640,545 B2 | 2/2014 | Zusman et al. | |
| 8,677,975 B2 | 3/2014 | Auclair et al. | |
| 8,680,707 B2 | 3/2014 | Childs et al. | |
| 8,849,471 B2 | 9/2014 | Daniel et al. | |
| 2008/0229806 A1 | 9/2008 | Cubr et al. | |
| 2009/0276147 A1 | 11/2009 | Hamama et al. | |
| 2010/0174472 A1 | 7/2010 | Matsushima et al. | |
| 2013/0151127 A1 | 6/2013 | Saito et al. | |
| 2014/0238120 A1 * | 8/2014 | Gwidt | G01L 23/225 73/114.07 |

FOREIGN PATENT DOCUMENTS

| | | |
|---|---|---|
| EP | 1447654 | 8/2004 |
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jerry Jacob Bizub.
U.S. Appl. No. 14/587,434, filed Dec. 31, 2014, Jeffrey Jacob Bizub.
Reduction Piston Slap Excitation by Optimizing Piston Profiles; Takayuki Koizumi et al,; Proc. of 2002 IMAC-XX: Conf, & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.
Bolt loosening detection using vibration characteristics of thin plate with piezoelectric elements;Takeshi Nakahara et al; Proc.of SPIE 5391, Smart Struc. & Materials, Jul. 2004.

\* cited by examiner

SYSTEM AND METHOD FOR DETECTING RECIPROCATING DEVICE ABNORMALITIES UTILIZING STANDARD QUALITY CONTROL TECHNIQUES

BACKGROUND

The subject matter disclosed herein relates to knock sensors, and more specifically, to utilizing knock sensors mounted to large, multi-cylinder reciprocating devices (e.g., combustion engine, compressors, etc.) in conjunction with standard quality control techniques to detect reciprocating device abnormalities.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power. During use, combustion engines may experience various noises, mechanical faults, or changes in conditions that may be difficult to detect and/or predict.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a controller configured to receive a signal acquired by the at least one knock sensor coupled to a reciprocating device, to sample the received signal, to analyze the sampled signal, and to utilize standard quality control (SQC) techniques to perform real-time diagnostics on the reciprocating device based on the analyzed signal.

In accordance with a second embodiment, a system includes a method for performing real-time diagnostics on a reciprocating device. The method includes utilizing a controller communicatively coupled to the reciprocating device for receiving a signal from at least one knock sensor coupled to the reciprocating device, sampling the received signal, analyzing the sampled signal, and utilizing SQC techniques to perform real-time diagnostics on the reciprocating device based on the analyzed signal.

In accordance with a third embodiment, a system includes a method for performing real-time diagnostics on a reciprocating device. The method includes utilizing a controller communicatively coupled to the reciprocating device for sampling a signal received from at least one knock sensor coupled to the reciprocating device, applying a temporal filter to the sampled signal to generate a temporal filtered signal, and applying a fast Fourier transform to the temporal filtered signal to generate a Fourier transformed signal. The method also includes utilizing the controller for generating a power spectral density from the Fourier transformed signal, and utilizing SQC techniques to perform real-time diagnostics on the reciprocating device based on the power spectral density.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

During use, combustion engines (or other reciprocating devices such as compressors) may experience various noises due to mechanical faults or changes in conditions that may be difficult to detect and/or predict. Knock sensors may be utilized to monitor a combustion engine. Occasionally, the knock sensor system records a noise, such as an abnormal or undesired noise. Rather than ignore and discard the unidentifiable noises, it may be advantageous to monitor the noise overtime to identify any potential faults (e.g., engine faults)

or abnormal conditions. These faults or conditions may include normal wearing maintenance items and/or abnormal component failures. It may also be advantageous to utilize SQC techniques (e.g., SQC charting techniques) for both diagnostics and advanced prognostics (e.g., to monitor for non-Gaussian behavior). By monitoring trends in certain noises detected by the knock sensor system, potential occurrences of failures may be detected earlier and corrective actions taken to reduce any potential collateral damage to the combustion engine caused by any engine failures, faults, and/or undesired changes in conditions. As described in further detail below, systems and method are provided for monitoring and analyzing abnormal noises within a combustion engine (or other reciprocating device) utilizing knock sensors utilizing SQC techniques, as described in more detail below.

Figure 1:
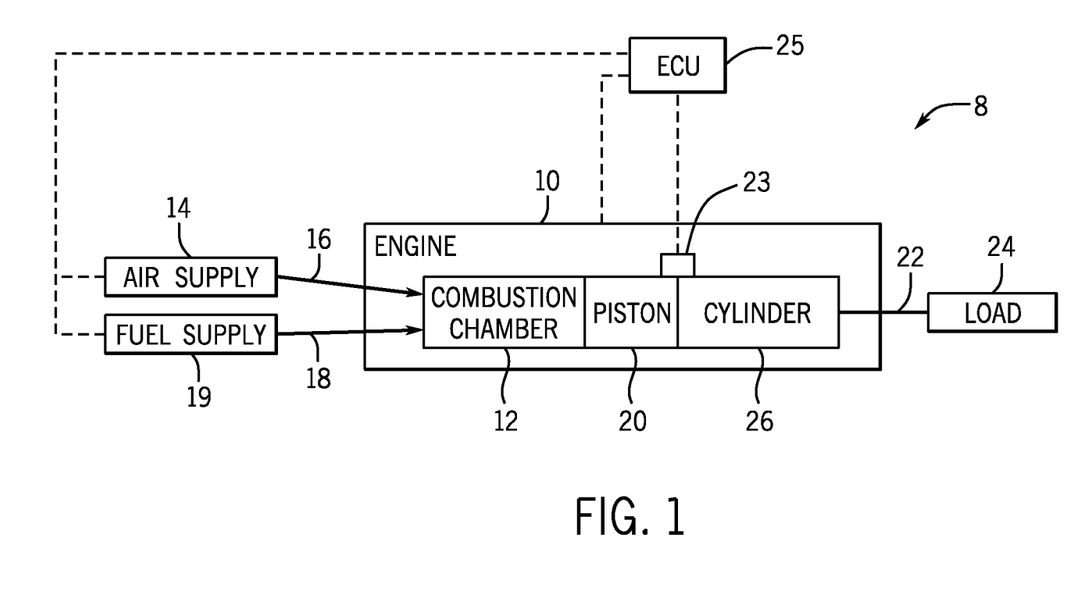
FIG. 1 is a block diagram of an embodiment of a portion of an engine driven power generation system in accordance with aspects of the present disclosure.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The engine driven power generation system 8 may include one or more knock sensors 23 suitable for detecting engine "knock." The knock sensor 23 may sense vibrations caused by the engine, such as vibration due to detonation, pre-ignition, and or pinging. In addition, the engine driven power generation system may include other sensors 27 (e.g., one or more temperature transducers) to detect other operating conditions (e.g., temperature (e.g., global temperature and/or temperature gradient) of a medium (e.g., cast iron) that the one or more knock sensors 23 are coupled to). The knock sensor 23 is shown communicatively coupled to an engine control unit (ECU) 25. During operations, signals from the knock sensor 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust boost pressure to eliminate the knocking. As further described herein, the knock sensor 23 may additionally derive that certain vibrations should be further analyzed and categorized to monitor, for example, potentially undesired engine conditions. Although the following techniques are discussed in terms of a combustion engine, the same techniques may be applied to other reciprocating devices such as compressors.

Figure 2:
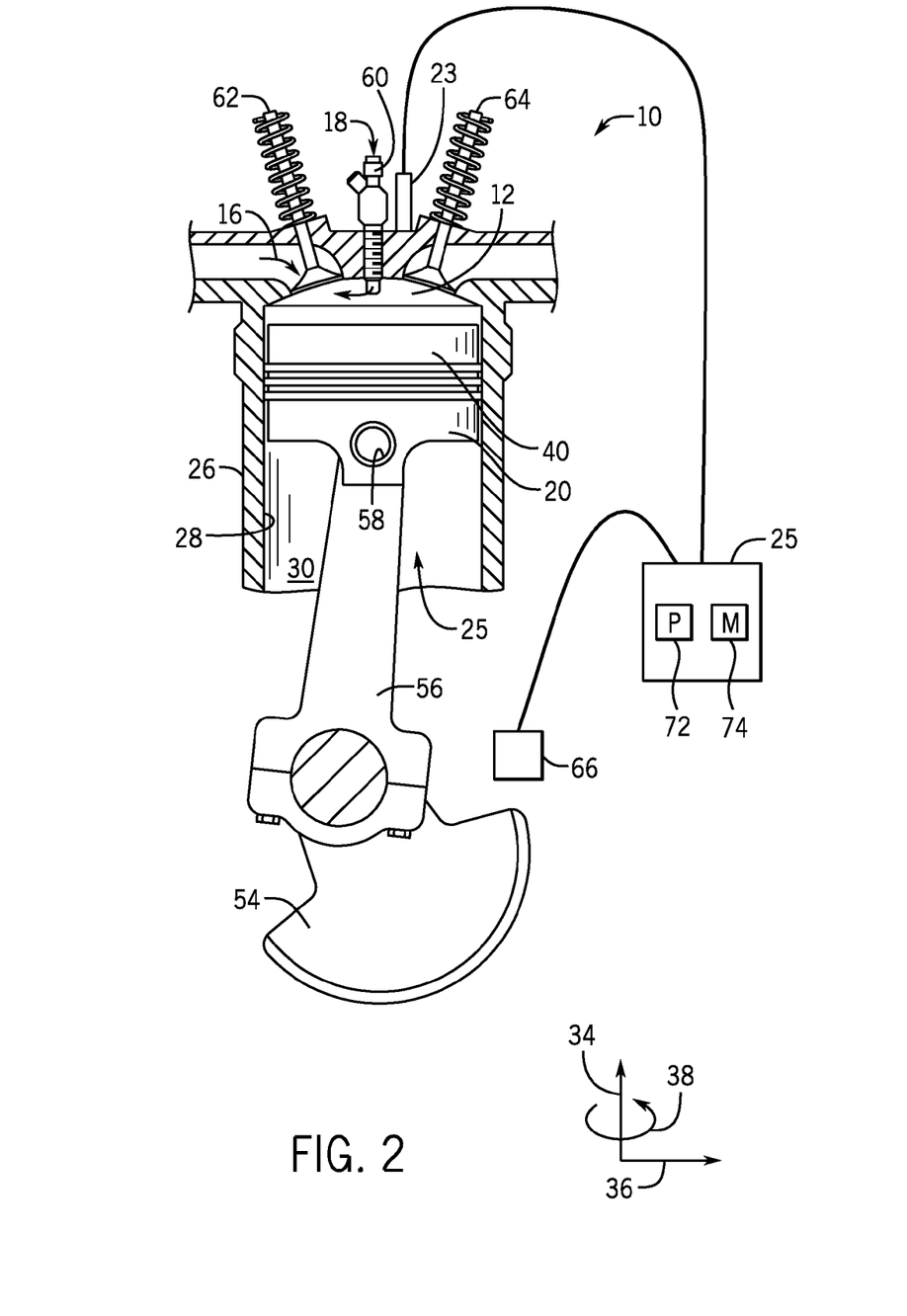
FIG. 2 is a side cross-sectional view of an embodiment of a piston assembly within a cylinder of the reciprocating engine shown in FIG. 1 in accordance with aspects of the present disclosure.

FIG. 2 is a side cross-sectional view of an embodiment of a piston assembly 25 having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process typically occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC while keeping the exhaust valve 64 open. The exhaust process thus expels the spent fuel-air mixture through the exhaust valve 64. It is to be noted that more than one intake valve 62 and exhaust valve 64 may be used per cylinder 26.

The depicted engine 10 also includes a crankshaft sensor 66, the knock sensor 23, and the engine control unit (ECU) 25, which includes a processor 72 and memory 74. The crankshaft sensor 66 senses the position and/or rotational speed of the crankshaft 54. Accordingly, a crank angle or crank timing information may be derived. That is, when monitoring combustion engines, timing is frequently expressed in terms of crankshaft 54 angle. For example, a full cycle of a four stroke engine 10 may be measured as a 720° cycle. The knock sensor 23 may be a Piezo-electric accelerometer, a microelectromechanical system (MEMS) sensor, a Hall effect sensor, a magnetorestrictive sensor, and/or any other sensor designed to sense vibration, acceleration, sound, and/or movement. In other embodiments, sensor 23 may not be a knock sensor, but any sensor that may sense vibration, pressure, acceleration, deflection, or movement.

Because of the percussive nature of the engine 10, the knock sensor 23 may be capable of detecting signatures even when mounted on the exterior of the cylinder 26. However, the knock sensor 23 may be disposed at various locations in or about the cylinder 26. Additionally, in some embodiments, a single knock sensor 23 may be shared, for example, with one or more adjacent cylinders 26. In other embodiments, each cylinder 26 may include one or more knock sensors 23 (e.g., one or more arrays of knock sensors 23 arranged along one or more planes through the engine 10). The crankshaft sensor 66 and the knock sensor 23 are shown in electronic communication with the engine control unit (ECU) 25. The ECU 25 includes the processor 72 and the memory 74 (e.g., a machine-readable medium). The memory 74 may store non-transitory code or computer instructions that may be executed by the processor 72. The ECU 25 monitors and controls and operation of the engine 10, for example, by adjusting combustion timing, valve 62, 64, timing, adjusting the delivery of fuel and oxidant (e.g., air), and so on.

Advantageously, the techniques described herein may use the ECU 25 to receive, acquire, or sample data (e.g., noise signals) from the one or more crankshaft sensors 66 and/or the one or more knock sensors 23. In order to detect and/or locate any coincident noises within the engine 10, data from the sensors (e.g., knock sensors and/or crankshaft sensors 66) may be sampled at both the same rate and taken at the same time. In certain embodiments, the noise signals utilized to detect and/or locate coincident noises may be received solely from the one or more knock sensors 23. In other embodiments, the noise signals may be utilized to detect and/or locate coincident noises may be received from both the crankshaft sensor 66 and the knock sensors 23. Each noise signal represents a noise signature of the engine 10 detected at a respective knock sensor 23. In certain embodiments, the ECU 25 creates a "noise" signature by plotting the knock sensor 23 data against the crankshaft 54 position. The ECU 25 may then go through the process of analyzing the data to derive normal (e.g., known and expected noises) and/or abnormal signatures (e.g., unknown or unexpected noises). The ECU 25 may then characterize the abnormal signatures (e.g., detect and/or locate coincident noises), as described in more detail below. By providing for signature analysis, the techniques described herein may enable more optimal and more efficient operations and maintenance of the engine 10.

Figure 3:
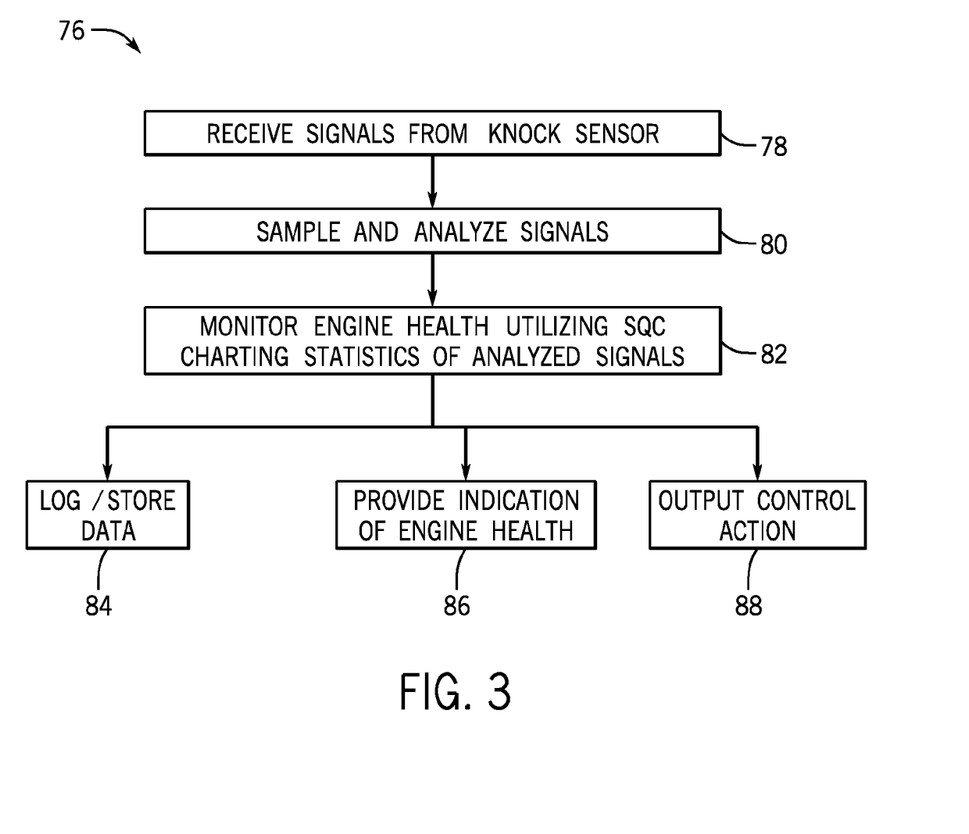
FIG. 3 is a flow chart illustrating an embodiment of a process for monitoring engine health in accordance with aspects of the present disclosure.

FIG. 3 is a flow chart illustrating an embodiment of a process 76 for monitoring engine health (e.g., the engine 10 in FIG. 2). A similar process may be utilized in monitoring health of a reciprocating device (e.g., compressor). The process 76 may be implemented as computer instructions or executable code stored in the memory 74 and executable by the processor 72 of the ECU 25 or any reciprocating device controller. The process 76 includes receiving one or more signals from one or more knock sensors 23 coupled to the engine 10 (block 78). The process 76 also includes sampling and analyzing the one or more signals received from the one or more knock sensors 23 (block 80). In certain embodiments, a single signal from a single knock sensor 23 may be continuously sampled and analyzed. In other embodiments, signals from multiple knock sensors 23 may be continuously sampled and analyzed, individually and/or in combination. The knock sensor 23 may be sampled in time buckets of equal sized octants or hexa-decants. For example, if the engine 10 is a four-stroke engine, two rotations of the crank occur for every combustion cycle. The knock sensors 23 would sample every 45 or 90 crank angle degrees during the four stroke cycle for a total of 8 or 16 times for each combustion event, respectively. In certain embodiments, a minimal filter may be applied (e.g., anti-aliasing filter) during the sampling of the received signals.

As described in greater detail, analyzing the sampled signals may include processing the sampled signals, for example, via temporal filtering. Temporal filtering assists in analyzing the signal because a small window of the signals is sampled (e.g., non-compression events during a combustion cycle). Temporal filtering may include applying a window function to the sampled signals prior to applying a fast Fourier transform (FFT). The window functions may include a Hamming window, flat top window, Blackman window, or any other type window function that may temporally filter the signals to enable analysis of the desired portion of the sampled signals. Certain mechanical failures or events in the engine 10 (or a reciprocating device such as a compressor) are associated with specific bands (e.g., specific frequencies within a spectrum of buckets or bins) and/or specific non-compression windowed events. A non-exhaustive list of these events may include abnormalities in peak firing pressure, an intake or exhaust valve sticking open or closed, a damaged intake or exhaust valve, damaged valve train, worn or damaged piston, worn or damaged piston pin and/or bushings, worn or damaged connecting rod and/or bearings, loose connecting rod bolts, loose counterweights and/or bolts, damaged main bearings, cam shaft lobe wear, broken or damaged piston rings, excessive blow-by in combustion cylinder, severely fretted cylinder liner, and/or severely scored cylinder liner. By temporal filtering the sampled signals, particular frequency and magnitude bins associated with specific events may be analyzed (subsequent to FFT). Subsequent to temporal filtering, analysis of the sampled signals may also include applying FFT and then obtaining a power spectral density (PSD) (magnitude) from the sampled signals. The power spectral density includes several spectral bins or buckets. An array of the spectral bins or buckets (e.g., associated with a specific event of interest such as peak firing pressure) obtained from multiple combustion cycles (or stroke cycles in the case of reciprocating devices such as compressors) may be averaged to obtain a baseline for each bin or bucket. In certain embodiments, each event (combustion cycle or combustion event) may have a weighted coefficient applied to generate a weighted average for the respective baseline.

As the engine wears, specific frequency bins associated with specific events (e.g., engine failures, faults, or abnormal conditions) may increase, while others decrease relative to the baseline. The process 76 further includes monitoring engine health utilizing SQC techniques such as SQC charting statistics (block 82) (e.g., to enable statistical process control). Monitoring engine health may include monitoring changes in real time (i.e., controlling the engine by receiving and processing the data from the knock sensors 23 and returning the results sufficiently quickly to affect the engine at that time) in the specific spectral bins or buckets to enable performance of diagnostics or advanced prognostics. A variety of SQC charting techniques may be utilized to generate control charts (e.g., process charts or quality control charts) that determine whether a sample of data (data from the knock sensors 23) falls within the common or normal range of variation. A variety of control charts may be utilized (e.g. I-Chart, q-q plot, etc.). Additional graphical techniques may also be utilized (e.g., such as histograms) in conjunction with the control charts. In certain embodiments, a chart may be displayed for a multidimensional array of spectral bins, where each bin includes an indicator that represents the trend in magnitude of the specific bin (e.g., an arrow pointing up for an increase in magnitude, an arrow pointing down for a decrease in magnitude, a horizontal arrow for no change in magnitude). In certain embodiments, the indicators may be color coated to indicate the severity of the trend (e.g., red for a 3-$\sigma$ deviation from a baseline, yellow or orange for a 2-$\sigma$ deviation from a baseline, etc.). Multiple control charts and/or graphical features may be generated for the different events described above.

In certain embodiments, monitoring engine health (e.g., long term engine health) may include setting sigma ($\sigma$) threshold levels (e.g., 3-$\sigma$ threshold levels, 2-$\sigma$ threshold levels, etc.) relative to the respective baselines and comparing the information derived from the presently sampled signals to look for trends and/or non-Gaussian behavior in the information obtained from the knock sensors 23. In certain embodiments, the baselines are continuously changing as new information is collected from the knock sensors 23. In other words, the baselines are trended and not reset (i.e., noise floor grows as a function of engine wearing).

While monitoring engine health, the process 76 includes logging and/or storing data gathered from the knock sensors and their subsequent analysis (block 84). The data may be stored on the memory 74 of the ECU 25 and/or in a memory of a remote device. The data stored may include flagged events and/or errors associated with deviations in the spectral bins (e.g., deviation of magnitude of one or more spectral bins of 2-$\sigma$ or greater relative to respective baselines). The process 76 also includes providing an indication of engine health (block 86). This may include providing a warning (e.g., warning flag) that certain frequency bands (i.e., spectral bins) are trending toward non-Gaussian behavior (e.g., deviation of 2-$\sigma$ but less than 3-$\sigma$ relative to a baseline). Warning (e.g., warning flags) may also be provided that certain frequency bands are at non-Gaussian levels (e.g., at or greater 3-$\sigma$ relative to a baseline). The warnings may include providing visual or textual warnings on a display coupled to the ECU 25 or on a remote device associated via a network (e.g., controller area network) with the ECU 25. Warnings may include communicating error codes (e.g., associated with specific events such as those described above) via proprietary software. Providing indications of engine health may also include displaying control charts generated utilizing the SQC charting techniques as well as other graphical features (e.g., histograms).

The process 76 further includes, in certain embodiments, outputting a control action that affects the engine 10 (block 88). Examples of control action include adjusting a condition within the engine (e.g., speed, load, positions of valves, etc.), shutting down the engine, and other actions. Outputting a control that affects the engine 10 enables closed-loop control of the engine 10 in response to the information obtained from the knock sensors 23. In certain embodiments, control actions may only be outputted when certain frequency bands have reached non-Gaussian levels (e.g., at or greater 3-$\sigma$ relative to a baseline). In other embodiments, control actions may be outputted for certain frequency bands trending toward non-Gaussian levels (e.g., deviation of 2-$\sigma$ but less than 3-$\sigma$ relative to a baseline) as well as frequency bands reaching non-Gaussian levels (e.g., at or greater 3-$\sigma$ relative to a baseline).

Figure 4:
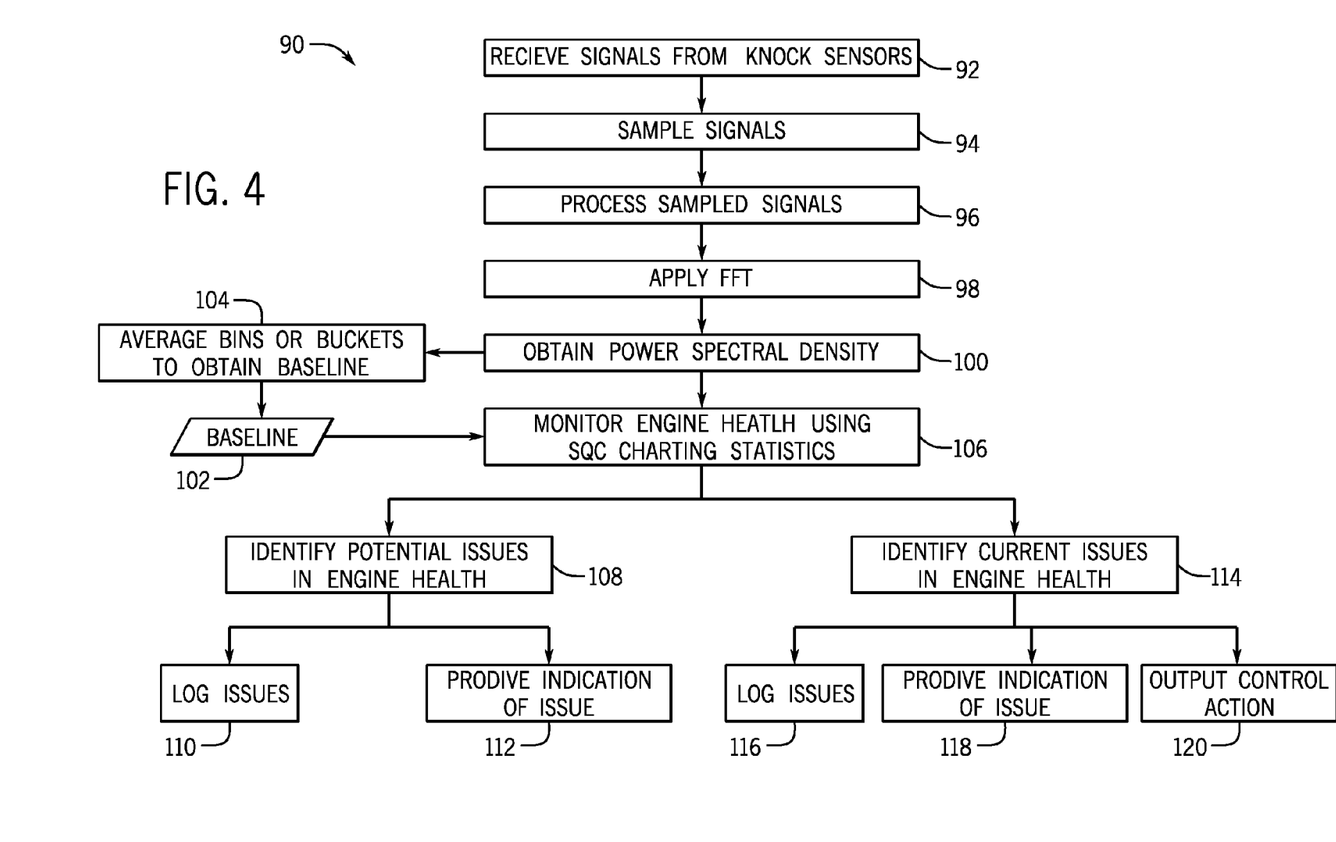
FIG. 4 is a flow chart illustrating an embodiment of a process for monitoring engine health utilizing fast Fourier transform (FFT) and power spectral density (PSD)

FIG. 4 is a flow chart illustrating an embodiment of a process 90 for monitoring engine health (e.g., the engine 10 in FIG. 2) utilizing FFT and PSD. A similar process may be utilized in monitoring health of a reciprocating device (e.g., compressor). The process 90 may be implemented as computer instructions or executable code stored in the memory 74 and executable by the processor 72 of the ECU 25 or any reciprocating device controller. The process 90 includes receiving one or more signals from one or more knock sensors 23 coupled to the engine 10 (block 92). The process 76 also includes sampling the one or more signals received from the one or more knock sensors 23 (block 92) as described above in FIG. 3. In certain embodiments, minimal filtering may be applied when sampling the received signals. For example, anti-aliasing filtering may be applied when sampling the received signals (e.g., to restrict bandwidth of the signal to satisfy the sampling theorem).

In addition, process 90 includes processing the sampled signals (block 96), for example, via temporal filtering. Temporal filtering assists in analyzing the signal because a small window of the signals is sampled (e.g., non-compression events during a combustion cycle). Temporal filtering may include applying a window function to the sampled signals prior to applying a FFT. The window functions may include a Hamming window, flat top window, Blackman window, or any other type window function that may temporally filter the signals to enable analysis of the desired portion of the sampled signals. Certain mechanical failures or events in the engine 10 as described above are associated with specific bands (e.g., specific frequencies within a spectrum of buckets or bins) and/or specific non-compression windowed events. By temporal filtering the sampled signals, particular frequency and magnitude bins associated with specific events may be analyzed (subsequent to FFT).

Subsequent to temporal filtering, the process 90 includes applying FFT to the temporally filtered, sampled signals (block 98) to generate Fourier transformed signals. The process 90 includes obtaining or generating a PSD (magnitude) from each of the Fourier transformed signals (block 100). The power spectral density includes several spectral bins or buckets. An array of the spectral bins or buckets (e.g., associated with a specific event of interest such as peak firing pressure) obtained from multiple combustion cycles (or stroke cycles in the case of reciprocating devices such as compressors) may be averaged to obtain a baseline 102 for each bin or bucket (block 104). In certain embodiments, the each event (combustion cycle or combustion event) may have a weighted coefficient applied to generate a weighted average for the respective baseline.

As the engine wears, specific frequency bins associated with specific events (e.g., engine failures, faults, or abnormal conditions) may increase, while others decrease relative to the baseline. The process 90 further includes monitoring engine health utilizing SQC techniques such as SQC charting statistics (block 106) (e.g., to enable statistical process control). Monitoring engine health may include monitoring changes in real time (i.e., controlling the engine by receiving and processing the data from the knock sensors 23 and returning the results sufficiently quickly to affect the engine at that time) in the specific spectral bins or buckets to enable performance of diagnostics or advanced prognostics. A variety of SQC charting techniques may be utilized to generate control charts (e.g., process charts or quality control charts) that determine whether a sample of data (data from the knock sensors 23) falls within the common or normal range of variation. A variety of control charts may be utilized (e.g. I-Chart, q-q plot, etc.). Additional graphical techniques may also be utilized (e.g., such as histograms) in conjunction with the control charts. In certain embodiments, a chart may be displayed for a multidimensional array of spectral bins, where each bin includes an indicator that represents the trend in magnitude of the specific bin (e.g., an arrow pointing up for an increase in magnitude, an arrow pointing down for a decrease in magnitude, a horizontal arrow for no change in magnitude). In certain embodiments, the indicators may be color coated to indicate the severity of the trend (e.g., red for a 3-$\sigma$ deviation from a baseline, yellow or orange for a 2-$\sigma$ deviation from a baseline, etc.). Multiple control charts and/or graphical features may be generated for the different events described above.

In certain embodiments, monitoring engine health (e.g., long term engine health) may include identifying potential issues in engine health (e.g., a trend toward non-Gaussian behavior relative the baseline 102) based on changes in specific frequency bands associated with particular events (block 108) utilizing the SQC charting statistics. If potential issues are identified, the process 90 includes logging and/or storing data gathered from the knock sensors and their subsequent analysis related to the potential issue (block 110). The data may be stored on the memory 74 of the ECU 25 and/or in a memory of a remote device. The data stored may include flagged events and/or errors associated with deviations in the spectral bins (e.g., deviation of magnitude of one or more spectral bins between 2-$\sigma$ and 3-$\sigma$ relative to respective baselines). If potential issues are identified, the process 90 also includes providing an indication of the potential issue with the engine (block 112). This may include providing a warning (e.g., warning flag) that certain frequency bands (i.e., spectral bins) are trending toward non-Gaussian behavior (e.g., deviation of 2-$\sigma$ but less than 3-$\sigma$ relative to a baseline). The warnings may include providing visual or textual warnings on a display coupled to the ECU 25 or on a remote device associated via a network (e.g., controller area network) with the ECU 25. Providing indications of the potential issue with the engine may also include displaying control charts generated utilizing the SQC charting techniques as well as other graphical features (e.g., histograms).

In certain embodiments, monitoring engine health (e.g., long term engine health) may include identifying current or actual issues (e.g., imminent) in engine health (e.g., data displaying non-Gaussian behavior relative the baseline 102) based on changes in specific frequency bands associated with particular events (block 114) utilizing the SQC charting statistics. If potential issues are identified, the process 90 includes logging and/or storing data gathered from the knock sensors and their subsequent analysis related to the current or actual issue (block 116). The data may be stored on the memory 74 of the ECU 25 and/or in a memory of a remote device. The data stored may include flagged events and/or errors associated with deviations in the spectral bins (e.g., deviation of magnitude of one or more spectral bins greater than 3-$\sigma$ relative to respective baselines). If current or actual issues are identified, the process 90 also includes providing an indication of the current or actual issue with the engine (block 118). This may include providing a warning (e.g., warning flag) that certain frequency bands (i.e., spectral bins) are displaying non-Gaussian behavior (e.g., deviation at or greater than 3-$\sigma$ relative to a baseline). The warnings may include providing visual or textual warnings on a display coupled to the ECU 25 or on a remote device associated via a network (e.g., controller area network) with the ECU 25. Warnings may include communicating error codes (e.g., associated with specific events such as those described above) via proprietary software. Providing indications of the potential issue with the engine may also include displaying control charts generated utilizing the SQC charting techniques as well as other graphical features (e.g., histograms).

The process 90 further includes, in certain embodiments, outputting a control action that affects the engine 10 (block 120) in response to identifying current or actual issues in engine health based on the SQC charting statistics. Examples of control action include adjusting a condition within the engine (e.g., speed, load, positions of valves, etc.), shutting down the engine, and other actions. Outputting a control that affects the engine 10 enables closed-loop control of the engine 10 in response to the information obtained from the knock sensors 23.

Figure 5:
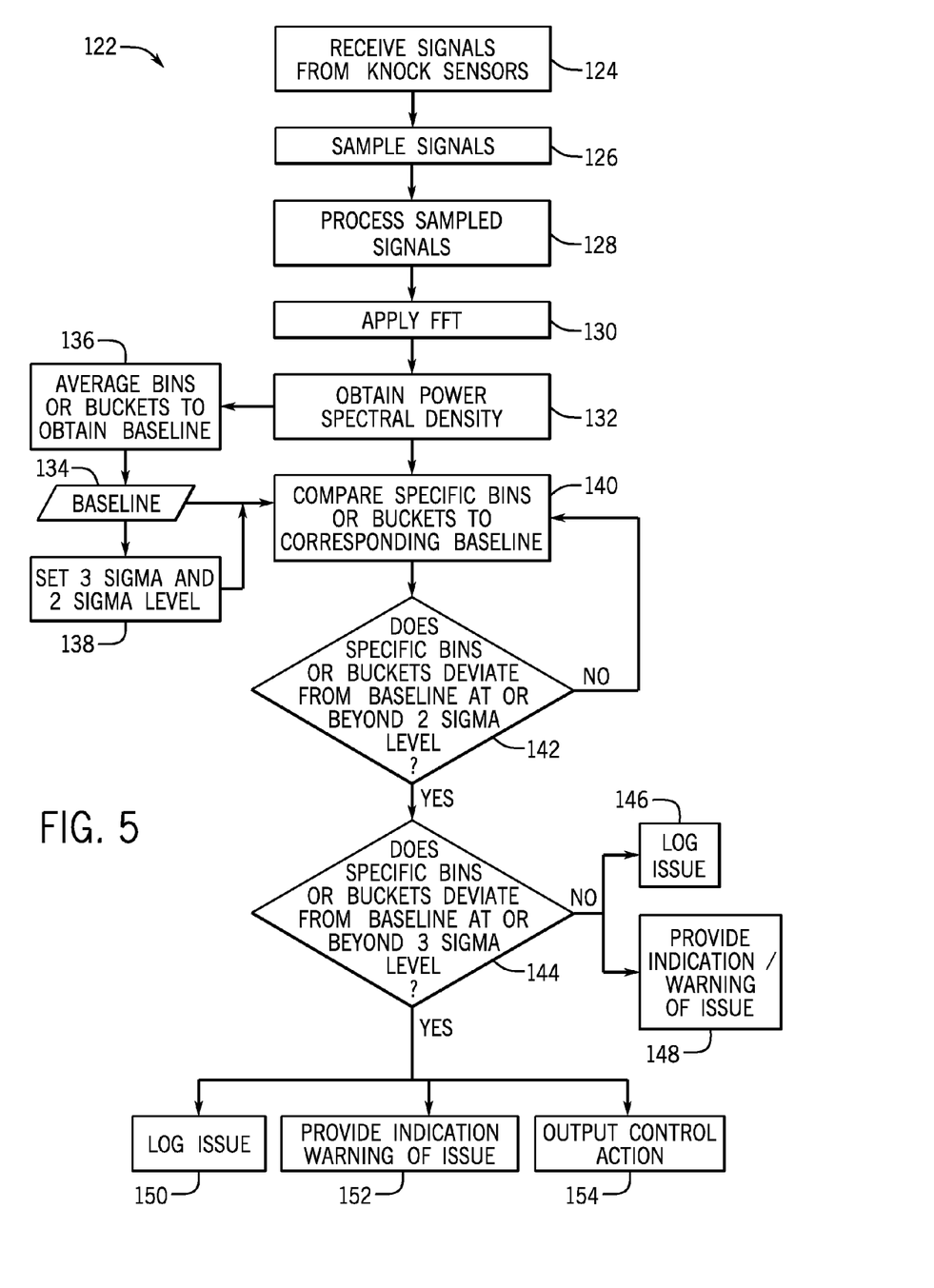
FIG. 5 is a flow chart illustrating an embodiment of a process for monitoring engine health utilizing FFT, PSD, and different sigma threshold levels.

FIG. 5 is a flow chart illustrating an embodiment of a process 122 for monitoring engine health (e.g., the engine 10 in FIG. 2) utilizing FFT, PSD, and different sigma ($\sigma$) threshold levels. A similar process may be utilized in monitoring health of a reciprocating device (e.g., compressor). The process 122 may be implemented as computer instructions or executable code stored in the memory 74 and executable by the processor 72 of the ECU 25 or reciprocating device controller. The process 122 includes receiving one or more signals from one or more knock sensors 23 coupled to the engine 10 (block 124), sampling the one or more signals received from the one or more knock sensors 23 (block 126), and processing the sampled signals (block 128) as described above in FIG. 4. In addition, the process 122 includes applying a FFT to generate Fourier transformed signals (block 130) and obtaining or generating a PSD for each of the Fourier transformed signals (block 132) as described above in FIG. 4.

The power spectral density includes several spectral bins or buckets. An array of the spectral bins or buckets (e.g., associated with a specific event of interest such as peak firing pressure) obtained from multiple combustion cycles (or stroke cycles in the case of reciprocating devices such as compressors) may be averaged to obtain a baseline 134 for each bin or bucket (block 136). In certain embodiments, the each event (combustion cycle or combustion event) may have a weighted coefficient applied to generate a weighted average for the respective baseline.

The process 122 includes setting 2-σ and 3-σ threshold levels relative to each baseline (block 138). In certain embodiments, additional threshold levels may be set (e.g., 1-σ, 1.5-σ, etc.). The process 122 also includes comparing specific bins or buckets to their corresponding baselines to monitor for non-Gaussian behavior (block 140). The process 122 includes determining if specific bin or buckets deviate from their respective baselines at or beyond the respective 2-σ threshold level (block 142). If the specific bin or buckets do not deviate from their respective baselines by at least 2-σ, then the process 122 includes continuing the compare specific bins or buckets to their corresponding baselines (block 140). However, if the specific bin or buckets do deviate at least 2-σ from their respective baselines, the process 122 includes determining if the specific bins or buckets deviate from their respective baselines at or beyond the respective 3-σ threshold level (block 144). Blocks 142 and 144 may occur sequentially or simultaneously. If the specific bin or buckets do not deviate from their respective baselines by at least 3-σ, then the process 122 includes logging or storing the issue (block 146) and/or providing an indication or warning with regard to the trend toward non-Gaussian behavior (block 148) as described above in FIGS. 3 and 4. If the specific bin or buckets do deviate from their respective baselines by at least 3-σ, then the process 122 includes logging or storing the issue (block 150), providing an indication or warning with regard to the non-Gaussian behavior (block 152), and/or outputting a control action with regard to the engine (or reciprocating device) as described above in FIGS. 3 and 4.

Figure 6:
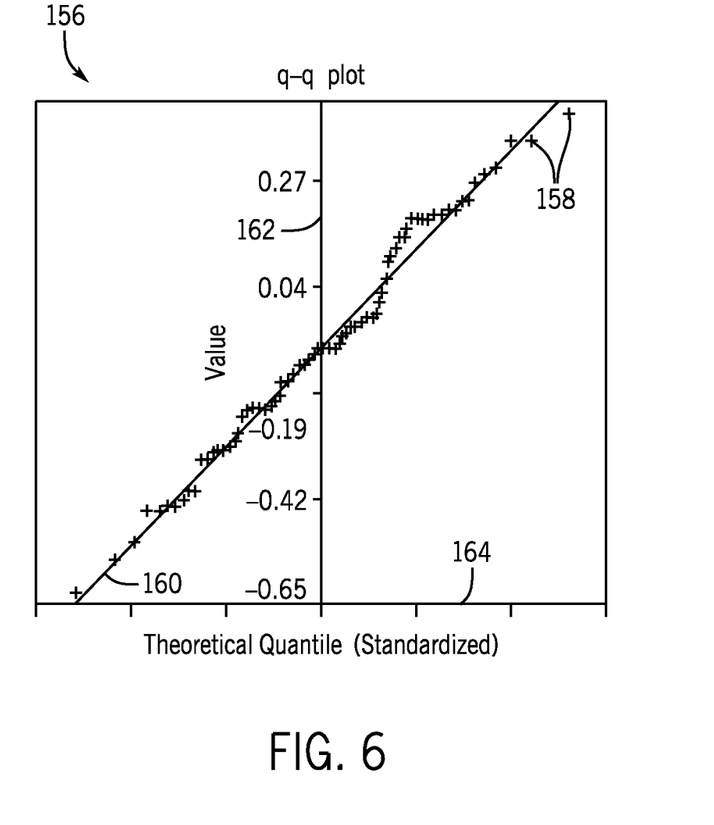
FIG. 6 is an embodiment of a SQC chart (e.g., q-q plot) in accordance with aspects of the present disclosure.

FIG. 6 is an embodiment of an example of a SQC chart utilized in the SCQ charting techniques described above. The SQC chart depicted in FIG. 6 is a q-q plot (also known as quantile-quantile plot or Quantile plot) 156. The q-q plot 156 depicts observed peak values (e.g., corresponding to peak firing pressure) received from a knock sensor 23 for each combustion event (as represented by the pluses 158) relative to a straight line 160. The straight line 160 represents a Weibull plot of an empirical cumulative distribution function that has been linearized. The y-axis 162 represents the value for the peak values and the x-axis 164 represents the theoretical quantile or standardized expected values. A temporal filter (e.g., window function) is applied to the data to specifically analyze peak firing pressure. Different temporal filters may be applied to the data from the knock sensor to look at other events (e.g., intake valve or other events described above).

Figure 7:
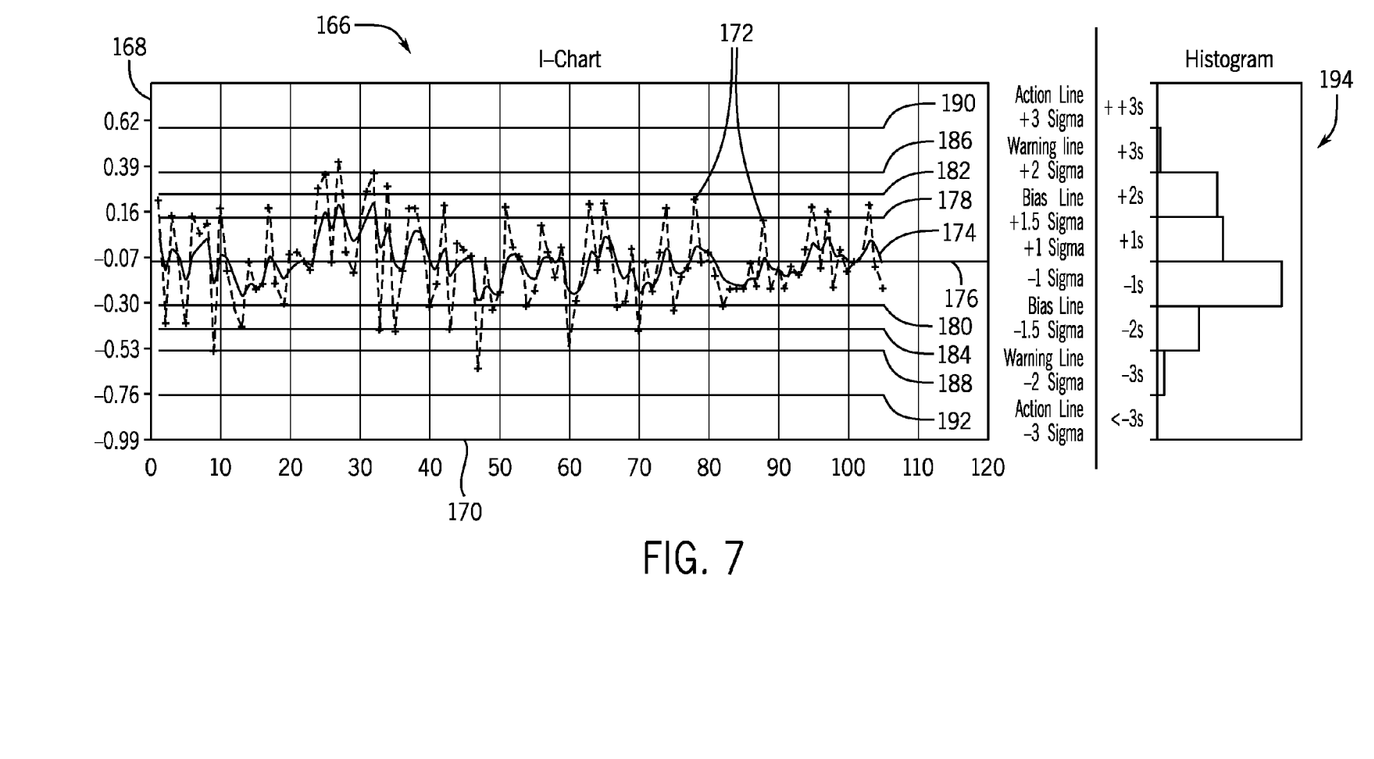
FIG. 7 is an embodiment of a SQC chart (e.g., I-chart) and associated graphical feature in accordance with aspects of the present disclosure.

FIG. 7 is an embodiment of a SQC chart and associated graphical feature (e.g., histogram) utilized in the SQC charting techniques described above. The SQC chart depicted in FIG. 7 is an I-chart 166. The y-axis 168 represents the value for the peak values (e.g., corresponding to peak firing pressure). The x-axis 170 represents the number of events or data points over time. The I-chart 166 depicts the observed peak values (e.g., corresponding to peak firing pressure) received form a knock sensor 23 for each combustion event (as represented by the pluses 172). The observed peak values 172 are time-ordered from left to right. The I-chart 166 depicts the moving range (e.g., short-term variability) between consecutive observation points (i.e., values 172) as represented by reference numeral 174. The I-chart 166 also depicts the average or baseline for the values as represented by line 176. The I-chart 166 also depicts various σ threshold levels relative the baseline 176. For example, 1σ, –1σ, 1.5σ (bias line), –1.5σ (bias line), 2σ (warning line), –2σ (warning line), 3σ (action line), and –3σ (action line) are depicted as represented by lines 178, 180, 182, 184, 186, 188, 190, and 192, respectively. The σ threshold levels may be utilized as described above in FIGS. 3-5. FIG. 7 also depicts a histogram 194 that graphically demonstrates the number of events whose value (as shown in the I-chart 166) fall within certain σ threshold levels. A temporal filter (e.g., window function) is applied to the data to specifically analyze peak firing pressure. Different temporal filters may be applied to the data from the knock sensor to look at other events (e.g., intake valve or other events described above).

Technical effects of the disclosed embodiments include providing systems and methods for monitoring the health of a reciprocating device (e.g., combustion engine, compressor, etc.). Utilizing information or data gathered from the knock sensors, SCQ statistical techniques (e.g., SQC charting techniques) may be utilized to analyze specific bin or buckets of the analyzed signal (e.g., for non-Gaussian behavior or trends towards non-Gaussian behavior) to determine the occurrence or future occurrence of normal wearing maintenance items and/or abnormal component failures in advance. The systems and methods may utilized for diagnostics and advanced prognostics to minimize or avoid damage to the reciprocating device as well as any downtime for the equipment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a combustion engine;
   a controller comprising a memory and a processor and communicatively coupled to the combustion engine, wherein the controller is programmed to receive a signal acquired by at least one knock sensor coupled to the combustion engine, to sample the received signal, to temporal filter the sampled signal, to apply a fast Fourier transform to the temporal filtered signal to generate a Fourier transformed signal, to generate a power spectral density having a plurality of spectral bins from the Fourier transformed signal, to apply a weighted coefficient to each spectral bin of the plurality of spectral bins, to average each weighted spectral bin of the plurality of weighted spectral bins over a plurality of cycles to generate a respective baseline for each weighted spectral bin for use with a control chart, to utilize each weighted spectral bin as input into the control chart, to set 3 sigma threshold levels for each weighted spectral bin relative to the respective baseline for use with the control chart, to compare one or more weighted spectral bins associated with known combustion engine failures from the plurality of weighted spectral bins to their respective baselines and associated 3 sigma threshold levels, and to utilize statistical process control utilizing the control chart to perform real-time diagnostics on the combustion engine based on analysis of the received signal and to alter operation of the combustion engine when one or more weighted spectral bins deviate from their respective baselines by at least the 3 sigma threshold level.

2. The system of claim 1, wherein the controller is configured to temporal filter the sampled signal by utilizing a window function.

3. The system of claim 1, wherein the controller is configured to set 2 sigma threshold levels for each weighted spectral bin relative to its respective baseline.

4. The system of claim 3, wherein the controller is configured to compare one or more weighted spectral bins associated with known combustion engine failures from the plurality of weighted spectral bins to their respective baselines and associated 2 sigma threshold levels.

5. The system of claim 4, wherein the controller is configured to provide an indication if the one or more weighted spectral bins deviate from their respective baselines by at least the 2 sigma threshold level.

6. A method for performing real-time diagnostics on a combustion engine, comprising:
utilizing a controller having a memory and a processor and communicatively coupled to the combustion engine for:
receiving a signal from at least one knock sensor coupled to the combustion engine;
sampling the received signal;
temporal filtering the sampled signal;
applying a fast Fourier transform to the temporal filtered signal to generate a Fourier transformed signal;
applying a weighted coefficient to each spectral bin of the plurality of spectral bins;
averaging each weighted spectral bin of the plurality of weighted spectral bins over a plurality of cycles to generate a respective baseline for each weighted spectral bin for use with a control chart;
utilizing each weighted spectral bin as input into the control chart, to set 3 sigma threshold levels for each weighted spectral bin relative to the respective baseline for use with the control chart;
setting 3 sigma threshold levels for each weighted spectral bin relative to the respective baseline for use with the control chart;
compare one or more weighted spectral bins associated with known combustion engine failures from the plurality of weighted spectral bins to their respective baselines and associated 3 sigma threshold levels; and
utilizing statistical process control utilizing the control chart to perform real-time diagnostics on the combustion engine based on analysis of the received signal and to alter operation of the combustion engine when one or more weighted spectral bins deviate from their respective baselines by at least the 3 sigma threshold level.

7. The method of claim 6, wherein temporal filtering the sampled signal comprises applying a window function to sampled signal.

8. The method of claim 6, comprising setting 2 sigma threshold levels for each weighted spectral bin relative to its respective baseline.

9. The method of claim 8, comprising comparing one or more weighted spectral bins associated with known combustion engine failures from the plurality of weighted spectral bins to their respective baselines and associated 2 sigma threshold levels.

10. The method of claim 9, comprising providing an indication if the one or more weighted spectral bins deviate from their respective baselines by at least the 2 sigma threshold level.

* * * * *